United States Patent [19]

Vanetta et al.

[11] Patent Number: 4,870,934

[45] Date of Patent: Oct. 3, 1989

[54] APPARATUS FOR CONTROLLING ENGINE SPEED

[75] Inventors: Aldo Vanetta, Ingolstadt; Helmut Burkhart, Gaimersheim; Herbert Weinert, Ingolstadt, all of Fed. Rep. of Germany

[73] Assignee: Audi AG, Ingolstadt, Fed. Rep. of Germany

[21] Appl. No.: 110,394

[22] Filed: Oct. 20, 1987

[30] Foreign Application Priority Data

Nov. 7, 1986 [DE] Fed. Rep. of Germany ....... 3637958

[51] Int. Cl.$^4$ ............................................. F01D 11/02
[52] U.S. Cl. .................................... 123/336; 123/325; 123/442
[58] Field of Search ................. 123/325, 336, 394, 442

[56] References Cited

U.S. PATENT DOCUMENTS 4,462,357 7/1984 Lockhart ......................... 123/442 X

FOREIGN PATENT DOCUMENTS 2376948 9/1978 France ................................. 123/325
1185644 3/1970 United Kingdom ................ 123/325

Primary Examiner—Tony M. Argenbright
Attorney, Agent, or Firm—Lalos & Keegan

[57] ABSTRACT

In a device on a motor vehicle with an internal combustion engine as the drive source and an accelerator pedal and transmission means for controlling the power of the internal combustion engine a switch activated when the accelerator pedal is actuated is provided in the power control system, which switch, in the non-activated state, prevents the internal combustion engine from delivering power exceeding its idling power. If the internal combustion engine is provided with an overrun cut-off for interrupting the fuel supply during overrun operation, the switch can be the idling switch of the overrun cut-off.

17 Claims, 2 Drawing Sheets

APPARATUS FOR CONTROLLING ENGINE SPEED

BACKGROUND AND DISCUSSION OF THE INVENTION

The invention relates to a device on a motor vehicle with an internal combustion engine as the drive source and an accelerator pedal and transmission means for controlling the power of the internal combustion engine.

In controlling the power of internal combustion engines, problems can occur in traveling operation by the fuel and/or air-metering or control member remaining open as a result of faults such as, for example, sticking, tightness, breaking of the restoring spring, and the like within the power control system (accelerator pedal or transmission means), and thus the internal combustion engine unintentionally delivers power.

The object of the invention is to reliably exclude with simple means the possibility of the internal combustion engine unintentionally delivering power.

This object is achieved by a switching system in conjunction with fuel control means to prevent engine operation above idling power under certain circumstances. The switch, according to the invention, can be provided either directly on the accelerator pedal plate or at the connection of the transmission means (accelerator cable, accelerator linkage), ensures that the internal combustion engine delivers power only when the accelerator pedal is actuated by the operator. On the other hand, if the load on the accelerator pedal is relieved by the operator, the fuel-metering member, a throttle member in the intake line or the ignition of the internal combustion engine is controlled via the switch, and thus delivery of power exceeding the idling power is prevented. The switch actuating force $F^S$ has to be smaller than the actuating force $F^L$ of the power control system. Thus, when the accelerator pedal is actuated the switch is activated first and only then is the power control element or the metering member actuated.

The idling switch normally arranged on the throttle valve part of the combustion-air intake pipe of the internal combustion engine can be used especially advantageously in a motor vehicle with an internal combustion engine with overrun cut-off. This substantially increases the reliability without extra expenditure on switching parts. The internal combustion engine can be operated on no load, because the overrun cut-off does not act here. However, if the speed of the internal combustion engine increases, for example if the restoring spring in the power control system has broken off and consequently the throttle valve moves into the open position, the overrun cut-off—because the idling switch of the overrun cut-off remains deactivated—becomes effective and interrupts the fuel supply. The internal combustion engine cannot therefore deliver power exceeding the idling power.

Two exemplary embodiments of the invention are described below in greater detail.

DETAILED DESCRIPTIONS OF THE PREFERRED EMBODIMENT

Figure 1:
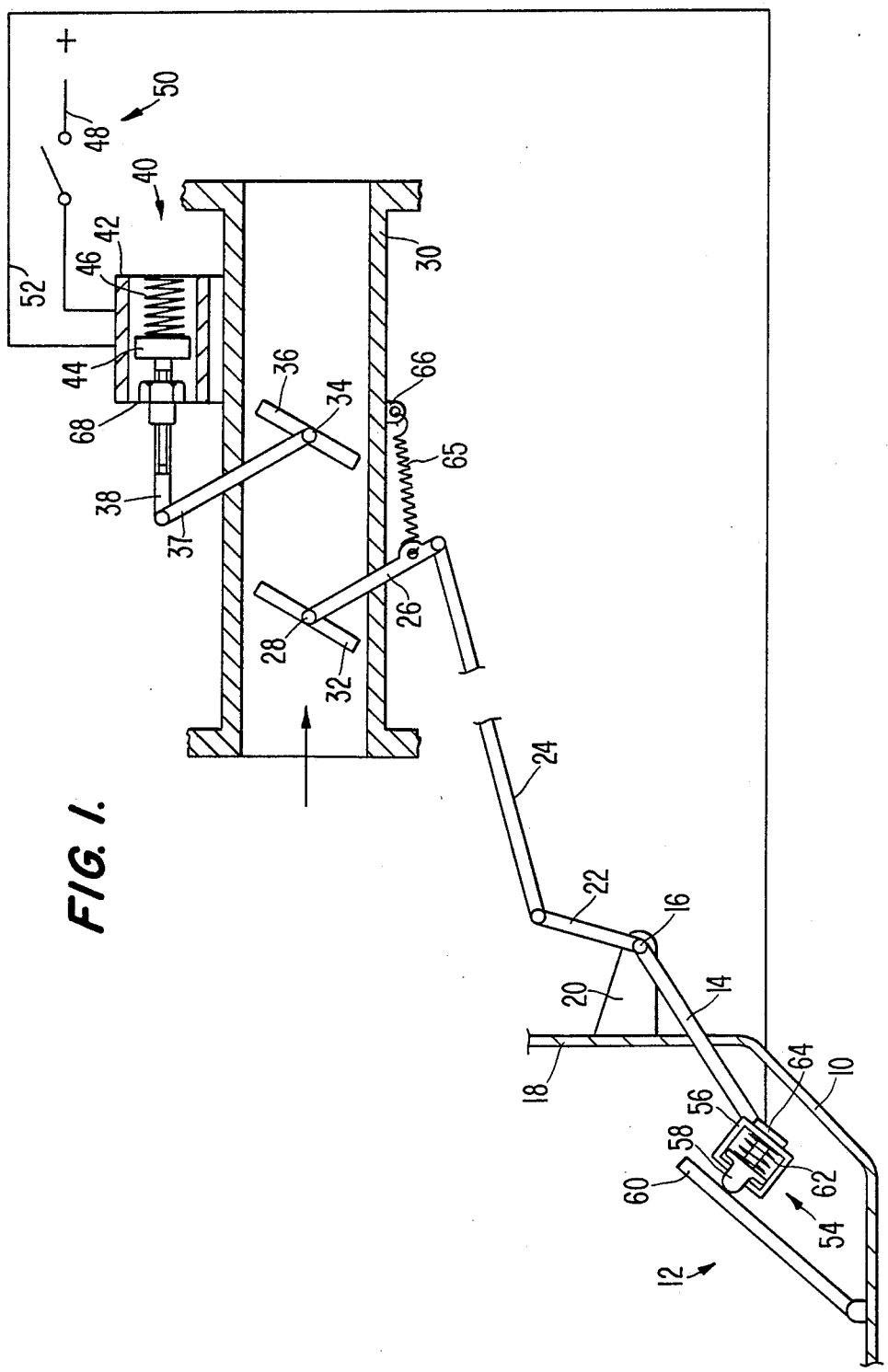
FIG. 1 shows a device according to the invention of a throttle-controlled internal combustion engine with a switch in the linkage of the power control system.

FIG. 1 shows, arranged on the floor panel 10 of a motor vehicle, a pivotable accelerator pedal 12 which acts on a two-armed lever 14. The lever 14 is pivotably mounted about an axis 16, with the axis 16 being located in a bracket 20 fixed on the end wall 18 of the motor vehicle. Arranged in an articulated manner on the free arm 22 of the lever 14 projecting into the engine space of the motor vehicle is a rod 24 which is connected on the other side to a lever 26. The lever 26 sits on a shaft 28 which is rotatable located in a pipe section 30 of the intake system (not shown) of the internal combustion engine. The shaft 28 bears a throttle valve 32, by means of which the intake cross section for the combustion air for the internal combustion engine can be controlled via the accelerator pedal 12 and the linkage parts 14, 24. The pipe section 30 is the throttle valve part of an internal combustion engine with fuel injection.

A further shaft 34 with a second throttle valve 36 is mounted in the pipe section 30. A lever 37 connected to the shaft 34 is connected to a pull rod 38 of an electromagnetic positioning element 40.

The electromagnetic positioning element 40 is provided with an attracting coil 42 which is arranged around a pull armature 44 connected to the pull rod 38. When the attracting coil 42 is dead a helical spring 46 presses the pull armature 44 into a position in which the throttle valve 36 is almost closed but permits idling operation of the internal combustion engine.

The attracting coil 42, which on one side is at the positive potential of the motor vehicle's electrical system via a line 48 and an ignition switch 50, is connected on the other side to a switch 54 via a line 52.

The switch 54 lies between the two-armed lever 14 and the accelerator pedal 12, the pressure pin 58 of which, displaceably guided in the switch housing 56, is in contact with the underside of the pedal plate 60 of the accelerator pedal 12. A compression spring 62 provided inside the switch housing 56 keeps the pressure pin 58 in its extended position in which the pressure pin 58, which is at the negative potential, is lifted from a center contact 64. The center contact 64 is connected to the line 52. The force $F_S$ of the compression spring 62 is substantially smaller than the force of the restoring spring 65 which is anchored on a projection 66 of the pipe section 30 and is hung on the lever 26.

When the accelerator pedal 12 is actuated by the operator, the pin 58 of the switch 54 is first pressed in until it bears against the center contact 64. At the same time, the attracting coil 42 of the electromagnetic positioning element 40 is connected to the negative potential, and the armature 44 is thus attracted. Accordingly, the second throttle valve 36 in the pipe section 30 is pulled into its fully open position. In addition, the throttle valve 32 can be actuated in conventional manner via the two-armed lever 14, the rod 24 and the lever 26. If the load on the accelerator pedal 12 is relieved again, the throttle valve 32 first of all returns into its position corresponding to the idling position of the internal combustion engine, with the second throttle valve 36 also returning into its closed position once the load on the switch 54 is relieved.

In the event of a fault, for example if the shaft 28 of the throttle valve 32 sticks or if the restoring spring 65 breaks off, the accelerator pedal 12 will admittedly be relieved of load by the operator, but the throttle valve 32 will not return into the closed position. However, by relieving the load on the accelerator pedal 12 the switch 54 or the pressure pin 58 is relieved of load and accordingly the electric circuit is broken at the attracting coil 42 so that the second throttle valve 36 is pivoted back into its closed position. Accordingly, the power of the internal combustion engine is throttled back in accordance with the idling power. Screwed onto the pull rod 38 is a threaded nut 68 which, in interaction with the front-end housing wall of the housing of the electromagnetic positioning element 40, forms an adjustable idling stop.

Figure 2:
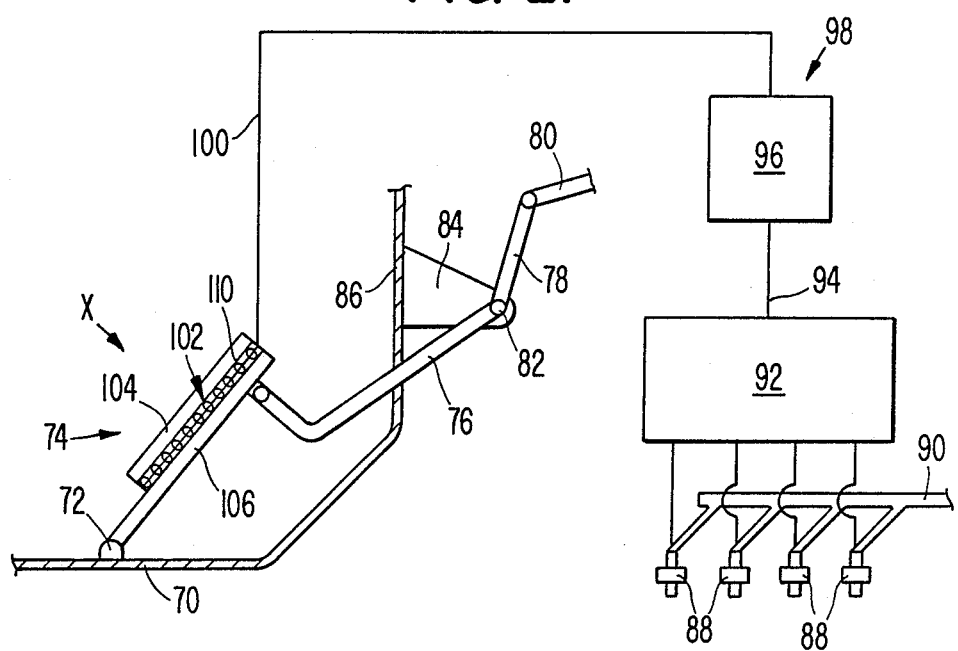
FIG. 2 shows a device on an internal combustion engine with electronic fuel injection, overrun cut-off and an idling switch at the accelerator pedal.

FIG. 2 again shows a part of the floor panel 70 which defines at the bottom the inner space of the motor vehicle and on which an accelerator pedal 74 is arranged in a pivotably movable manner via an axis 72. The accelerator pedal 74 acts on a two-armed lever 76, the arm 78 of which is connected in an articulated manner to a rod 80. The rod 80 acts on a throttle valve in the intake system of the internal combustion engine as shown in FIG. 1. The two-armed lever 76 is pivotably fixed on a bracket 84 via an axis 82, which bracket 84 is bolted to the splashboard 86 defining the engine space of the motor vehicle.

The internal combustion engine (not shown in greater detail) is provided with a fuel injection device with one injection valve 88 for each cylinder. The injection valves are supplied with fuel in known manner via a fuel line 90. The opening pulses of the injection valves 88 are controlled via an electronic control unit 92 in which the parameters specific to the engine, such as speed, load, combustion air throughput, temperature, etc., are fed and which meters the required fuel quantity in accordance with these parameters.

The control unit 92 is connected to a further control unit 96 via a line 94. The control unit 96 is used for the overrun cut-off of the internal combustion engine; i.e., when the motor vehicle is in an overrun phase (the internal combustion engine is being driven by the kinetic energy of the motor vehicle), the control unit 96 sends a signal to the control unit 92 which as a result interrupts the fuel supply by stopping the opening pulses at the injection valves 88. A speed switch and a logical combinational switching circuit are provided in known manner in the control unit 96.

Figure 3:
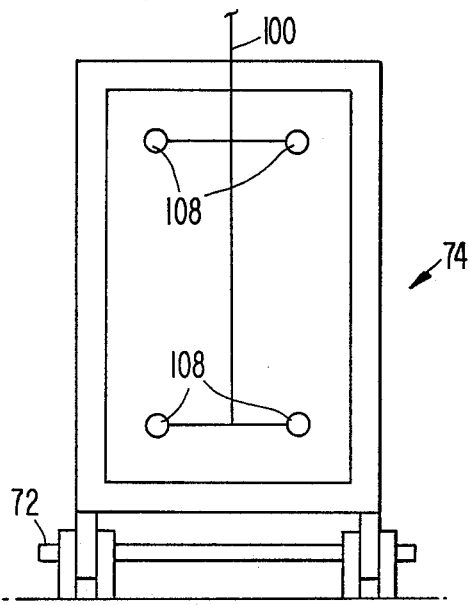
FIG. 3 shows a plan view of the accelerator pedal in FIG. 2.

The speed n of the internal combustion engine is fed into the control unit 96 via a line 98. Moreover, the control unit 96 is connected to a switch 102 via a line 100. The switch 102 supplies a signal to the control unit 96 when the pedal plate 104 adjacent to the switch 102 and mounted onto the gas pedal 74 is actuated by the operator. The switch 102 is therefore arranged between the pedal plate or upper plate 104 and the lower plate 106 pivotably coupled to the floor 70. The switch 102 (not shown in greater detail) consists of several contacts 108 (see FIG. 3) which are spatially separated from one another and are embedded in an elastomeric intermediate layer 110 between the two plates 104, 106. The contacts are bridged in each case when pressure is exerted at any point on the plate 104 by the operator's foot. The pressure force $F^S$ is again smaller than the actuating force $F_L$ which is necessary to actuate the power control system of the internal combustion engine via the two-armed lever 76 and the rod 80.

The control unit 96 for the overrun cut-off of the internal combustion engine and the control unit 92 for the control of the fuel injection can be of conventional design and are therefore not shown in greater detail. An overrun cut-off is effected if the speed of the internal combustion engine exceeds a speed threshold of, for example, 1300 revs/min$_{-1}$ and if the load on the accelerator pedal 74 is relieved or the switch 102 is deactivated. As soon as the speed of the internal combustion engine drops below this speed threshold or if the accelerator pedal 74 is actuated by the operator, the overrun cut-off is switched off and the internal combustion engine is again supplied with fuel.

If a fault in the power control system, for example if the throttle valve sticks, causes the internal combustion engine to reach a speed greater than 1300 rev/min$_{-1}$, but the accelerator pedal 74 on the other hand is not actuated, the overrun cut-off starts as in overrun operation of the motor vehicle and the fuel supply is interrupted. The internal combustion engine is therefore prevented from delivering power exceeding its idling power.

It may also be noted that the plate 106 of the accelerator pedal 74 is made larger than the plate 104 so that the plate 104 does not protrude at any point beyond the peripheral area of the plate 106. This ensures that the plate 104 cannot get unintentionally entangled or caught in parts located in the foot space of the motor vehicle, for example a floor carpet, and does not therefore unintentionally emit a signal which would eliminate the overrun cut-off.

The invention is not restricted to the exemplary embodiments shown. Thus the second throttle valve described in FIG. 1 can also be actuated pneumatically, hydraulically or by means of an electric motor. Instead of controlling the second throttle valve, the switch 54 can also control a fuel cut-off valve or an ignition interrupter switch. Moreover, the overrun cut-off according to FIG. 2 can also be of another design, for example a positioning device acting on the throttle valve of a carburetor of the internal combustion engine.

If the motor vehicle is equipped with an automatic speed control unit, the switch 53 or 102 is to be bridged when this speed control unit is activated. The operator then does not need to apply pressure to the accelerator pedal. On the other hand, when the control unit is switched off, it has to be ensured that the switch is operating again.

What is claimed is:

1. An apparatus for a motor vehicle with an internal combustion engine as a drive source, an accelerator pedal and transmission means for controlling the power of the internal combustion engine, comprising:
   a switch movable between an activated and a non-activated state by the accelerator pedal;
   said switch in the non-activated state, cooperating with said drive source to prevent the internal combustion engine from delivering power exceeding its idling power;
   said switch being arranged directly on the accelerator pedal to which pressure is applied by the operator; and
   the force required to activate said switch being less than the force required to actuate the accelerator.

2. An apparatus for a motor vehicle with an internal combustion engine as a drive source, an accelerator pedal and transmission means for controlling the power of the internal combustion engine, comprising:
- a switch movable between an activated and a non-activated state by the accelerator pedal;
- said switch in the non-activated state, cooperating with said drive source to prevent the internal combustion engine from delivering power exceeding its idling power;
- said switch being between the accelerator pedal and the transmission means in the direction of the line of force when the accelerator pedal is actuated; and
- the force required to activate said switch being less than the force required to actuate the accelerator.

3. An apparatus for a motor vehicle with an internal combustion engine as a drive source, an accelerator pedal and transmission means for controlling the power of the internal combustion engine, comprising:
- a switch movable between an activated and a non-activated state by the accelerator pedal;
- said switch in the non-activated state, cooperating with said drive source to prevent the internal combustion engine from delivering power exceeding its idling power;
- said switch being arranged directly on the accelerator pedal to which pressure is applied by the operator; and
- said switch being arranged between two accelerator pedal plates, an upper plate and a lower plate, which are movable relative to one another, with the upper plate to which pressure can be applied by the operator being made with a smaller periphery than the lower plate.

4. The apparatus according to claim 1 or 2, and further comprising a control means for controlling the fuel supply to the internal combustion engine, and wherein said switch in the non-activated state controls said control means to limit the fuel supply to idling power.

5. The apparatus according to claim 1 or 2, wherein the internal combustion engine is provided with an overrun cut-off device, and said switch is an idling switch for the overrun cut-off device.

6. An apparatus for a motor vehicle with an internal combustion engine as a drive source, an accelerator pedal and a transmission means for controlling power of the internal combustion engine comprising:
- (a) an intake pipe for an internal combustion engine with fuel injection;
- (b) a first throttle valve for controlling intake cross-section of said intake pipe;
- (c) a second throttle valve for controlling intake cross-section of said intake pipe;
- (d) said accelerator pedal connected to said first throttle valve for controlling combustion air delivered through said pipe;
- (e) said second throttle valve being movable between an idle position and an open position;
- (f) means for biasing said second throttle valve into said idle position;
- (g) electrical actuating means having an energized and de-energized state for overcoming said bias means and moving said second throttle valve into an open position in said energized state;
- (h) a switch being electrically connected to said electrical actuating means; said switch being movable between an open and a closed position; said actuating means being moved to said energized state to move said second throttle into an open position when said switch is moved to a closed position; and
- (i) said switch being connected to said accelerator for movement to the closed position upon actuation of said accelerator.

7. The apparatus according to claim 6 wherein said electrical actuating means includes a coil electrically connected to said switch and an armature connected to said second valve for moving said second valve to an open position when said coil is energized and an idle position when de-energized.

8. The apparatus according to claim 7 wherein said means for biasing said second throttle valve into said idle position includes said armature biased to an idle position by said bias means.

9. The apparatus according to claim 8 wherein said bias means for said switch is overcome by a force less than that required to move said first throttle means for actuation of said switch prior to actuation of said first throttle valve.

10. The apparatus according to claim 9 further comprising a linkage conecting said accelerator pedal to said first throttle valve; said switch being located between said linkage and said accelerator pedal.

11. The apparatus according to claim 10 wherein said linkage is connected to a linkage bias means for biasing said linkage to an idle position.

12. The apparatus according to claim 11 further comprising means connected to said armature for adjusting the idle position of said second throttle valve.

13. An apparatus for a motor vehicle with an internal composition engine as a drive source, an accelerator pedal and a transmission means for controlling power of the internal combustion engine comprising:
- (a) a throttle valve for controlling the air intake to the combustion engine, said throttle valve being connected to said accelerator;
- (b) injection valves for injecting fuel into said engine;
- (c) a valve electronic control unit for controlling opening pulses of said injection valves;
- (d) an overrun control unit electrically connected to said valve electronic control unit for transmitting a signal to said valve electronic control unit when said engine is in an overrun mode and said valve electronic control unit upon sensing said signal controls said valves to operate at an idle mode;
- (e) a switch movable between an open and a closed position for de-energizing said overrun control unit in a closed position and energizing said overrun control unit in an open position; and
- (f) said switch being connected to said accelerator for movement to a closed position when said accelerator is activated and to an open position when said accelerator is deactivated.

14. The apparatus according to claim 13 wherein said switch, valve electronic control unit and said overrun control unit cooperate to prevent said engine from reaching a preselected speed when the accelerator pedal is not actuated.

15. The apparatus according to claim 14 wherein said preselected speed is about 1300 rev/min.

16. The apparatus according to claim 14 wherein said accelerator includes a lower plate and an upper plate spaced therefrom by an elastomeric material; said switch includes a number of contacts embedded in said elastomeric material which are bridged when pressure is exerted at any point on the plate by the operator's foot.

17. The apparatus according to claim 16 wherein the force required to bridge the contacts is less than the force required to actuate the accelerator.

* * * * *